United States Patent
Leobandung et al.

(10) Patent No.: US 11,430,748 B2
(45) Date of Patent: Aug. 30, 2022

(54) INSPECTION AND IDENTIFICATION TO ENABLE SECURE CHIP PROCESSING

(71) Applicant: INTERNATIONAL BUSINESS MACHINES CORPORATION, Armonk, NY (US)

(72) Inventors: Effendi Leobandung, Stormville, NY (US); Wilfried Haensch, Somers, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 910 days.

(21) Appl. No.: 16/240,181

(22) Filed: Jan. 4, 2019

(65) Prior Publication Data

US 2020/0219827 A1     Jul. 9, 2020

(51) Int. Cl.
  *H01L 23/00*      (2006.01)
  *H01L 21/67*      (2006.01)
  *G06F 21/88*      (2013.01)
  *H01L 23/544*     (2006.01)

(52) U.S. Cl.
  CPC .............. *H01L 23/57* (2013.01); *G06F 21/88* (2013.01); *H01L 21/67063* (2013.01); *H01L 23/544* (2013.01)

(58) Field of Classification Search
  CPC . H01L 23/57; H01L 21/67063; H01L 23/544; G06F 21/88; G06F 21/86
  See application file for complete search history.

(56) References Cited

U.S. PATENT DOCUMENTS

| | | |
|---|---|---|
| 6,738,294 B2 | 5/2004 | Layman et al. |
| 7,829,168 B2 * | 11/2010 | Zhang ................ G03F 7/70466 428/64.1 |
| 8,741,713 B2 | 6/2014 | Bruley et al. |
| 8,767,445 B2 | 7/2014 | Chellappa et al. |
| 8,877,525 B1 | 11/2014 | Leobandung et al. |
| 9,502,405 B1 | 11/2016 | Cao et al. |
| 9,576,914 B2 | 2/2017 | Li et al. |
| 9,666,523 B2 * | 5/2017 | Wood ................... H01L 23/481 |
| 9,685,410 B2 | 6/2017 | Leobandung |
| 9,691,709 B2 | 6/2017 | Leobandung |
| 9,864,006 B1 | 1/2018 | Erickson et al. |
| 9,991,892 B2 | 6/2018 | Wacquez et al. |

(Continued)

OTHER PUBLICATIONS

Chellappa et al., "SRAM-Based Unique Chip Identifier Techniques", IEEE Transactions on Very Large Scale Integration (VLSI) Systems. vol. 24. No. 4. Apr. 2016. pp. 1213-1222.

(Continued)

*Primary Examiner* — Hosuk Song
(74) *Attorney, Agent, or Firm* — Tutunjian & Bitetto, P.C.; L. Jeffrey Kelly

(57) ABSTRACT

A computer-implemented method executed on a processor for detecting whether a wafer has been tampered during a semiconductor fabrication process, the method including, at a plurality of patterning steps where lithographic patterns are defined and etched or at a plurality of fabrication processing steps, marking, via an identification tool, each die with an unclonable identification in a memory array, inspecting, via an inspection tool, each of the dies, and removing compromised wafers from a wafer pool during the semiconductor fabrication process.

20 Claims, 8 Drawing Sheets

(56) References Cited

U.S. PATENT DOCUMENTS

| | | | |
|---|---|---|---|
| 10,050,167 B2* | 8/2018 | Cao | G06K 19/07372 |
| 10,341,108 B1* | 7/2019 | Smayling | G06F 21/73 |
| 10,534,554 B2* | 1/2020 | Tran | G06F 21/79 |
| 10,872,655 B2* | 12/2020 | Krilic | G11C 11/4072 |
| 11,038,701 B2* | 6/2021 | May | G06F 21/73 |
| 2010/0017009 A1* | 1/2010 | Baseman | G05B 19/0428 |
| | | | 700/109 |

OTHER PUBLICATIONS

Clark et al., "Physically Unclonable Functions using Foundry SRAM Cells", IEEE Transactions on Circuits and Systems-I: Regular Papers. Oct. 19, 2018. pp. 1-12.

Holcomb et al., "Power-Up SRAM State as an Identifying Fingerprint and Source of True Random Numbers", IEEE Transactions on Computers. vol. 58. No. 9. Sep. 2009. pp. 1198-1210.

Zhang et al., "Highly Stable Data SRAM-PUF in 65nm CMOS Process", 2013 IEEE 10th International Conference. Oct. 28, 2013. pp. 1-4.

* cited by examiner

INSPECTION AND IDENTIFICATION TO ENABLE SECURE CHIP PROCESSING

BACKGROUND

The present invention relates generally to semiconductors, and more specifically, to semiconductor device security.

The requirement to provide security in computer systems has led to the development of a variety of approaches for uniquely identifying microprocessors and other semiconductor devices that are part of the computer systems. Such approaches have included methods of inserting unique identification codes into integrated circuits of the semiconductor devices used in the computer systems. The challenge in mass producing semiconductor devices, where each die has a unique identification, includes maintaining quick manufacturing time, unclonability, and low costs.

Examples of some existing methods of incorporating unique identifications into semiconductor devices are as follows. A unique identification number can be stored in a non-volatile memory of the semiconductor device or fuses on the device can be blown to create the unique identification. However, these methods require additional circuitry on the semiconductor device resulting in increased size and cost of the individual die. Further, these methods usually yield semiconductor devices which are susceptible to being replicated or cloned.

SUMMARY

In accordance with an embodiment, a method is provided for detecting whether a wafer has been tampered during a semiconductor fabrication process. The method includes marking, via an identification tool, each die with an unclonable identification in a memory array, and inspecting, via an inspection tool, each of the dies. The marking and inspecting steps are performed at every major patterning step, where lithographic patterns are defined and etched, or at every fabrication processing step to remove compromised wafers from a wafer pool during the semiconductor fabrication process.

In accordance with another embodiment, a non-transitory computer-readable storage medium comprising a computer-readable program executed on a processor in a data processing system is provided for detecting whether a wafer has been tampered during a semiconductor fabrication process, wherein the computer-readable program when executed on the processor causes a computer to perform the steps of marking, via an identification tool, each die with an unclonable identification in a memory array, and inspecting, via an inspection tool, each of the dies. The marking and inspecting steps are performed at every major patterning step, where lithographic patterns are defined and etched, or at every fabrication processing step to remove compromised wafers from a wafer pool during the semiconductor fabrication process.

In accordance with yet another embodiment, a system is provided for detecting whether a wafer has been tampered during a semiconductor fabrication process. The system includes an identification tool for marking each die with an unclonable identification in a memory array, and an inspection tool for inspecting each of the dies. The marking and inspecting are performed at every major patterning step, where lithographic patterns are defined and etched, or at every fabrication processing step to remove compromised wafers from a wafer pool during the semiconductor fabrication process.

It should be noted that the exemplary embodiments are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be described within this document.

These and other features and advantages will become apparent from the following detailed description of illustrative embodiments thereof, which is to be read in connection with the accompanying drawings.

BRIEF DESCRIPTION OF THE DRAWINGS

The invention will provide details in the following description of preferred embodiments with reference to the following figures wherein.

Throughout the drawings, same or similar reference numerals represent the same or similar elements.

DETAILED DESCRIPTION

Embodiments in accordance with the present invention provide methods and devices for inserting intentional defects into semiconductor manufacturing levels and inspecting the die at every major patterning step, where lithographic patterns are defined and etched, or at each processing level. An identification tool is provided for creating the markings (or watermarks) and an inspection tool is provided for inspecting the dies to make sure no unintended or malicious modification on the dies exist. A marking can be referred to as unclonable identification (ID). Each die of a wafer can include one or more markings at different processing levels. A third party operator can control the inspection tool. The third party operator may not be associated with the semiconductor fabrication facility or plant.

In one example, one or more systems can provide for labeling (that is, identifying) semiconductor devices (e.g., chips) using defects. In another example, one or more methods can provide for labeling (that is, identifying) semiconductor devices (e.g., chips) using defects. In another example, one or more algorithms can provide for labeling (that is, identifying) semiconductor devices (e.g., chips) using defects.

It is to be understood that the present invention will be described in terms of a given illustrative architecture; however, other architectures, structures, substrate materials and process features and steps/blocks can be varied within the scope of the present invention. It should be noted that certain features cannot be shown in all figures for the sake of clarity. This is not intended to be interpreted as a limitation of any particular embodiment, or illustration, or scope of the claims.

Figure 1:
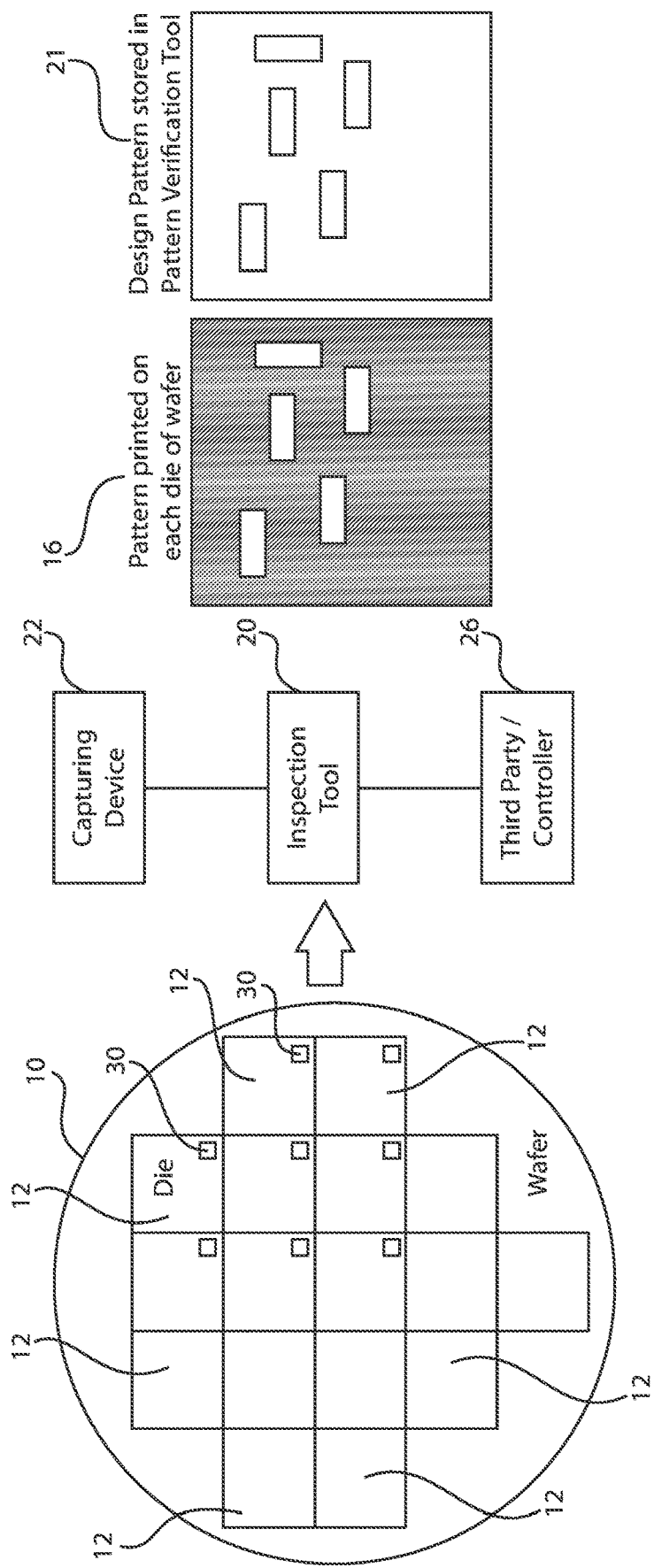
FIG. 1 is a block/flow diagram of an example inspection tool employed to compare a pattern printed on a wafer with an original design pattern, in accordance with an embodiment of the present invention.

FIG. 1 is a block/flow diagram of an example inspection tool employed to compare a pattern printed on a wafer with an original design pattern, in accordance with an embodiment of the present invention.

Semiconductor device manufacturing is a well-known process. Part of the process usually involves photo lithography. During such photo lithography, a wafer (e.g., silicon wafer) is coated with a chemical called a photoresist. A mask is placed over the wafer and select portions of the wafer under the mask are exposed to light (e.g., short wavelength light). The exposed regions are washed away by a developer solution. It is known in the conventional semiconductor device manufacturing processes that defects will usually exist in the finished product. These can be referred to actual defects that are acceptable.

In the present invention, intentional defects can be embedded in chips, e.g., in on-board chip memory. Such embedding can provide a mechanism such that there is essentially no practical way anyone can know which areas or regions or elements store the identification information, thus being secure against cloning the identification information. In another specific example, it is impossible (or impractical) to replicate or clone the chip because to determine the locations of defects, someone would need to de-layer the chip. Such a de-layering process would introduce so many defects it would be close to impossible to identify all the intentional defects.

Referring to FIG. 1, wafer 10 includes a plurality of chips 12. The chips can be referred to as die. The terms chips and die can be used interchangeably. Each chip 12 of the wafer 10 can be marked by an identifier 30. The identifier 30 can be, e.g., a memory array, such as, but not limited to, a static random access memory (SRAM) array. The SRAM array can be a small SRAM array (1-100 kB). This memory array can be added to each die for ID purposes only.

An inspection tool 20, also referred to as a pattern verification tool, can be employed to inspect each chip 12 of the wafer 10. The inspection tool 20 can employ, e.g., a capturing device 22 to inspect each chip 12 of wafer 10. The capturing device 22 can be, e.g., a high-resolution camera. The inspection tool 20 can scan each die by employing, e.g., a scanning electron microscope (SEM). The inspection tool 20 can be secured physically and electronically to avoid tampering.

The inspection tool 20 can be operated or controlled by, e.g., a third party 26. The third party 26 can be any entity that wishes to inspect a chip fabrication process. For example, the third party 26 does not own a semiconductor fabrication facility or plant (also referred to as a fab). Such fab can run in the billions of dollars. However, such third party 26 may wish to design and create its own chips or integrated circuits (ICs). Therefore, such third party 26 needs to use an existing fab. Moreover, the third party 26 needs to be assured that the ICs created in the fab are secure or uncompromised by, e.g., malicious content. The inspection tool 20 allows only the third party 26 to be able to inspect the die of a wafer at every step or level of manufacture to make sure no unintended or malicious modification on the dies exist.

The pattern 16 printed on each die of the wafer 10 is compared to an original or initial design pattern 21 that is stored in the inspection tool 20. The original design pattern 21 can be known only by the third party 26 that is handing the inspection tool 20.

The above described method has the advantage that very small additional die area is used and therefore the semiconductor device size does not increase by much. Another advantage is that the device cannot be replicated or cloned. In order to replicate or clone the device, the location of the defects would have to be known. This would involve de-layering the device to attempt to find the intentional defects. However, the de-layering process would itself introduce so many defects that it would be difficult, if not impossible, to identify the intentional defects.

Figure 2:
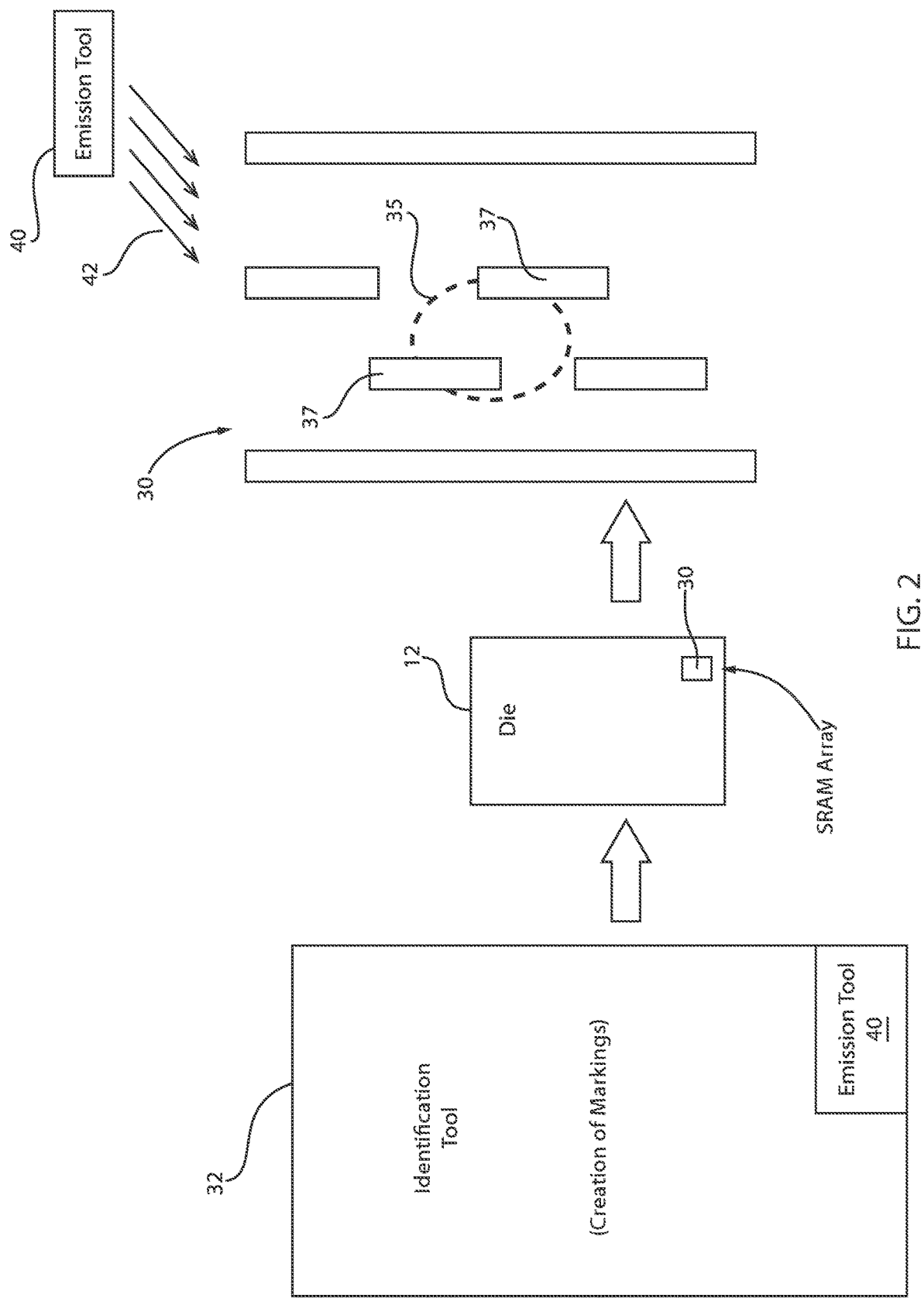
FIG. 2 is a block/flow diagram of an example identification tool employed to create intentional defects on each die of a wafer, in accordance with another embodiment of the present invention.

FIG. 2 is a block/flow diagram of an example identification tool employed to create intentional defects on each die of a wafer, in accordance with another embodiment of the present invention.

An identification tool 32 can be used to create markings in each chip 12 of the wafer 10. The die can include a memory array, such as, but not limited to, an SRAM array which can receive the intentional defect. The intentional defect can be damaged bits in the memory array. For example, bits 37 of memory array 30 can be intentionally damaged during semiconductor processing. The damaged bits 37 can be disposed in a region 35 of the memory array 30. The bits can be selectively damaged by bombarding one or more areas of the memory array with high-energy beams, selected species implants, laser heat, etc. The damaged bits are not physically detectable but can only be detected at electrical test once the dies complete the fabrication. Only the inspection tool 32 can determine which bits have been damaged.

The identification tool 32 can include an emission tool 40 for emitting, e.g., a beam 42 onto the memory array 30 of the chip 12 to create the intentional defects.

In one example, an embodiment of the present invention can intentionally introduce defects into a semiconductor device by using direct electron-beam. Electron beams can damage the devices on region 35 due to energetic particles. Electron beams can also directly deposit layers of organic material on region 35 to cause it to fail due to defects from the deposited organic material. Another way to make intentional defects on region 35 is to use an electron beam for direct write. Electron-beam (e-beam) lithography is a form of maskless lithography which involves scanning a focused beam of electrons to draw custom shapes on a surface covered with an electron-sensitive film called a resist (this is considered exposing the resist). The electron beam changes the solubility of the resist thus enabling selective removal of either the exposed or non-exposed regions of the resist by immersing the resist in a solvent (this is considered developing the resist). The goal is to create very small structures in the resist that can subsequently be transferred to the substrate material via, for example, etching. A primary advantage of e-beam lithography is that it can draw custom patterns (direct e-beam write) with sub-10 nanometer resolution. In accordance with embodiments of the present invention, direct e-beam writes can be used not to draw custom patterns on a resist but rather to introduce defects directly into existing circuit elements (e.g., vias) of the semiconductor device. Thus, a "defect" as illustratively used herein refers to an intentional fault introduced into a given circuit element of a semiconductor device by, for example, at least one direct e-beam write that causes the given circuit element to not function (partially or completely) as it is intended to function.

Advantageously, defects introduced into one or more existing memory areas will result in failed memory bits. In one example, these failed bits can be detected by writing a predetermined data pattern into the entire memory on the device and then reading the entire memory. The memory cells that do not return the expected data bit from the predetermined data pattern represent the failed memory bits. This writing and then reading (scanning) process to detect the failed memory bits can also be done on a cache area by cache area basis. In any event, the detected failed bits are then to be used as the ID of the semiconductor device.

In an illustrative example, a memory can include hundreds of thousands of bits. Approximately 10 to 1000 bits can be randomly chosen where the e-beam direct write is used to create the defects. A microprocessor, for example, will scan the whole memory array and identify the locations of the failing bits. These locations will be used as the secure chip ID. Defects can be inserted or imprinted anywhere on the semiconductor device including a dedicated array both on the core areas, as well as the cache areas, in order to create a secure chip ID.

Moreover, according to exemplary embodiments of the present invention, defects are introduced into a plurality of randomly selected circuit elements in the semiconductor device. In one exemplary embodiment, a random number generator can be used in the random selection process. For example, the random number generator can produce random numbers associated with the location or coordinates of vias in the cache area of a microprocessor. These coordinates can be used to direct the e-beam to one or more locations where a defect is to be introduced. The e-beam writer can also be programmed to avoid going into the core areas.

Figure 3:
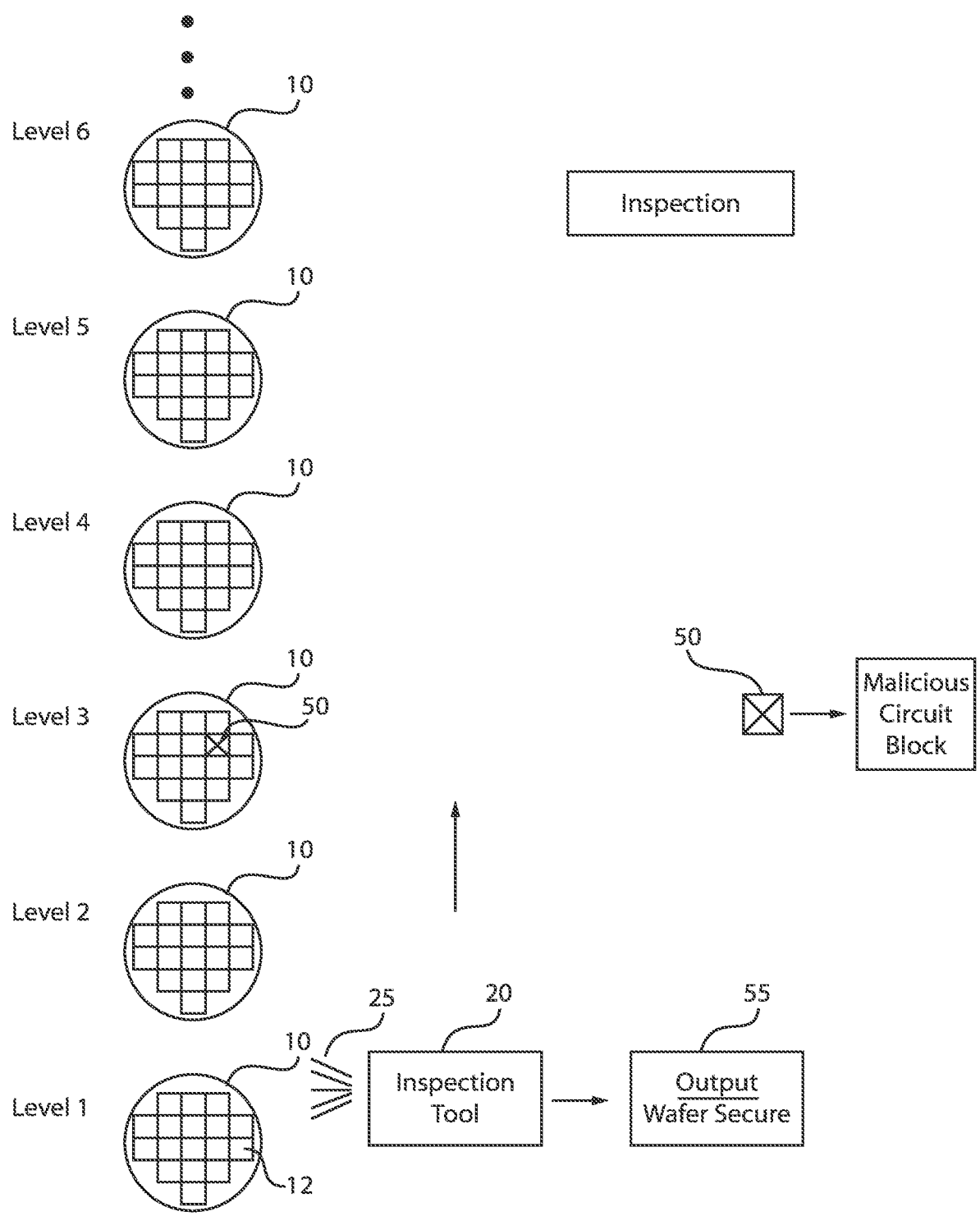
FIG. 3 is a block/flow diagram of an example inspection process where each die of each wafer is inspected for potential malicious circuit blocks, in accordance with an embodiment of the present invention.

FIG. 3 is a block/flow diagram of an example inspection process where each die of each wafer is inspected for potential malicious circuit blocks, in accordance with an embodiment of the present invention.

The inspection tool 20 can inspect via a scanning device 25 the chip 12 of the wafer 10 to determine if there are any malicious circuit blocks 50. At level 1 processing, it was determined that no malicious circuit block 50 is present. Thus, the output 55 can be provided to a user interface of a computing device that notifies the user that the wafer is secure at this point. The process continues sequentially through the other levels.

Figure 4:
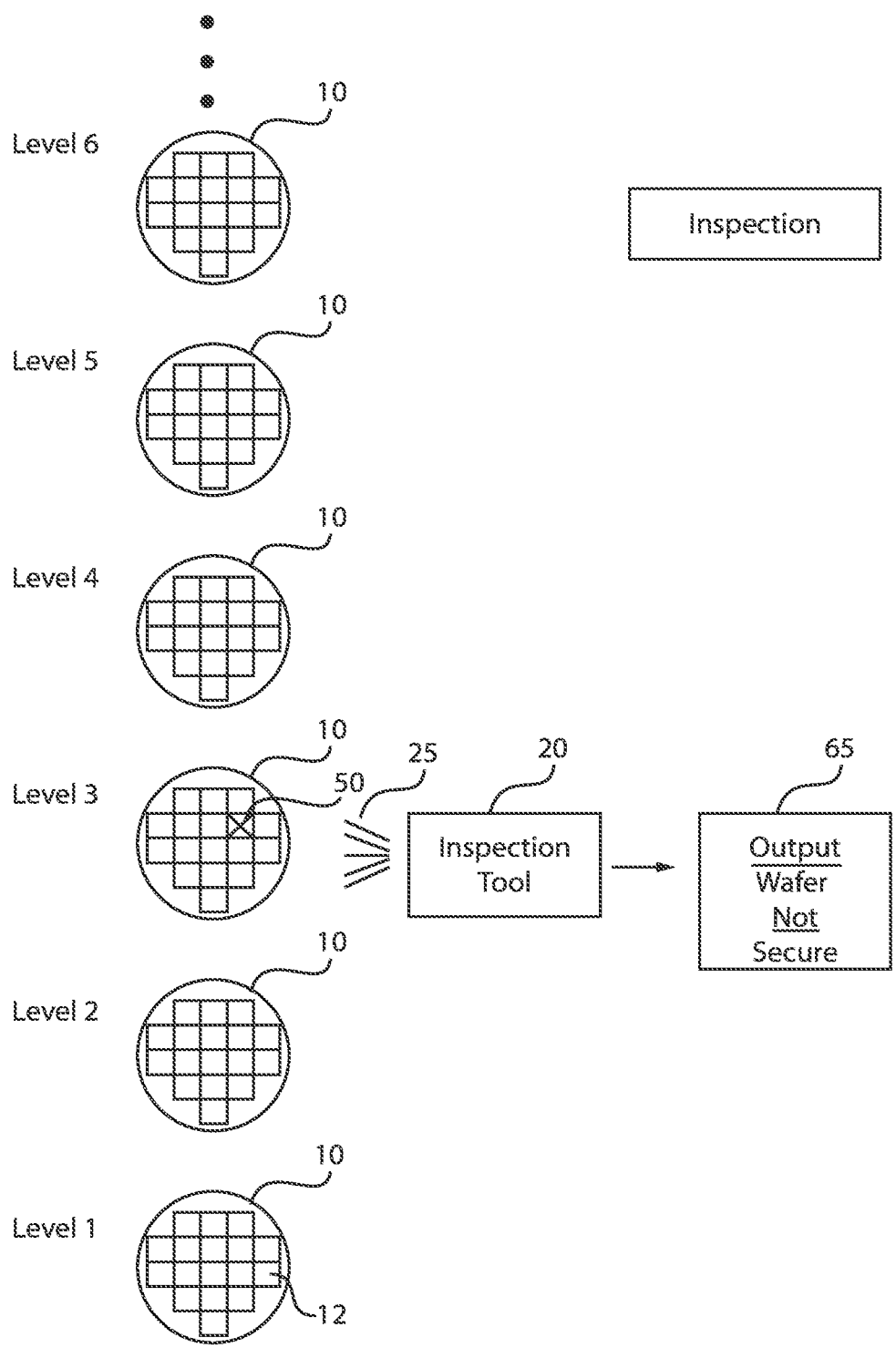
FIG. 4 is a block/flow diagram of an example inspection process where each die of each wafer is inspected and a potential malicious circuit block has been detected, in accordance with an embodiment of the present invention.

FIG. 4 is a block/flow diagram of an example inspection process where each die of each wafer is inspected and a potential malicious circuit block has been detected, in accordance with an embodiment of the present invention.

The inspection tool 20 also confirmed that at level 2 processing, that no malicious circuit blocks 50 are present. The inspection tool 20 indicates a positive result to the user and the wafer is permitted to go into level 3 processing. At level 3 processing, it was determined that a malicious circuit block 50 is present. Thus, at this point of processing, the inspection tool 20 transmits a notification of output 65 indicating that the wafer is not secure. In other words, it appears that the wafer has been compromised. The processing can end immediately such that the compromised wafer does not proceed to level 4 processing. The compromised wafer can be removed from the wafer pool to be further inspected at a separate location. Thus, the chip 12 of a wafer 10 can be examined or evaluated or inspected at every processing level to determine whether malicious circuits 50 have been inserted. The inspection tool 20 can, in one example, inspect each and every processing level at which an intentional defect has been inserted or imprinted.

Figure 5:
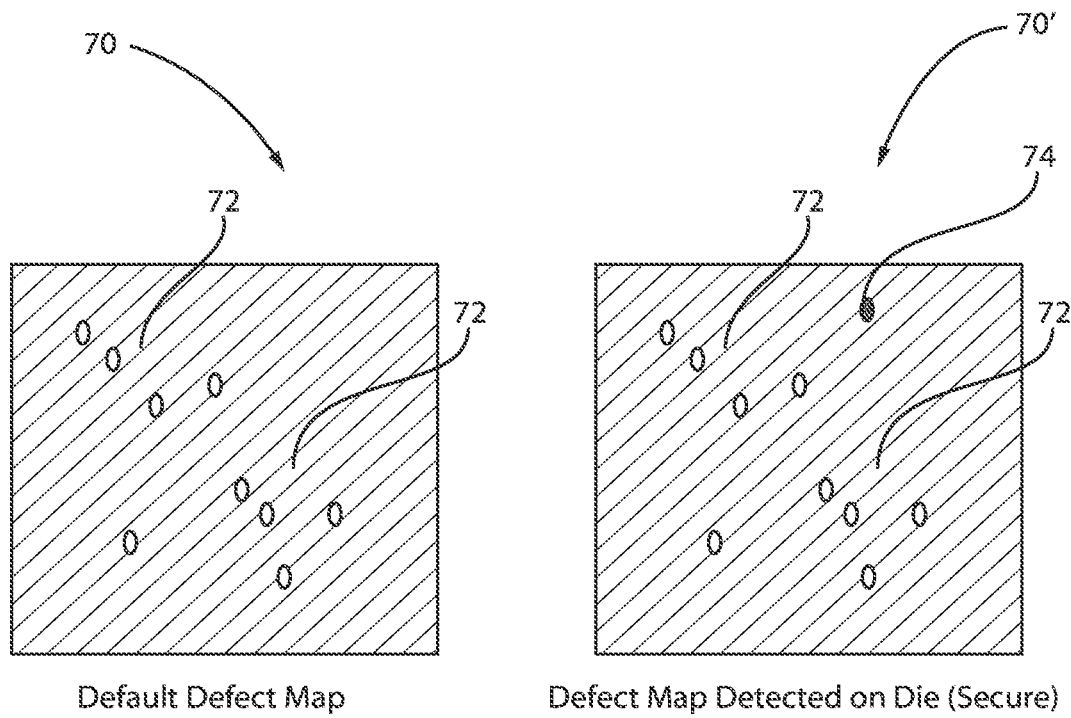
FIG. 5 is a block/flow diagram of a comparison between a default defect map and a defect map detected on a die, where the die is deemed to be secure, in accordance with an embodiment of the present invention.

FIG. 5 is a block/flow diagram of a comparison between a default defect map and a defect map detected on a die, where the die is deemed to be secure, in accordance with an embodiment of the present invention.

The default defect map 70 includes a plurality of intentional defects 72 inserted or imprinted into a memory array 30 of a chip 12 on a wafer 10. The defect map 70' detected on the die by electrical test tool 1080 (FIG. 9) at the end of processing includes the intentional defects 72, as well as another defect 74. The defect 74 is an actual defect inadvertently created during the manufacturing of the chip. Defect 74 is not out of the ordinary. This defect does not impact the secure identifications of the die.

Actual defects 74 can be distinguished from intentional defects 72 by artificial intelligence techniques. In particular, machine learning or deep leaning techniques can be employed. The machine learning can employ training data. The training data can pertain to previously collected data related to defects in semiconductor devices. Intentional defect information collected can be provided to a training database including the training data. The training data can be continuously updated, in real-time.

In the instant case, the electrical test tool 1080 (FIG. 9) at the end of processing determines that the defect map is acceptable and that the wafer is secure. In other words, when a comparison is made between the defect map 70' and the initial or original or default map 70, it is determined that the defects 72 are correct and that the chip 12 has not been compromised.

Figure 6:
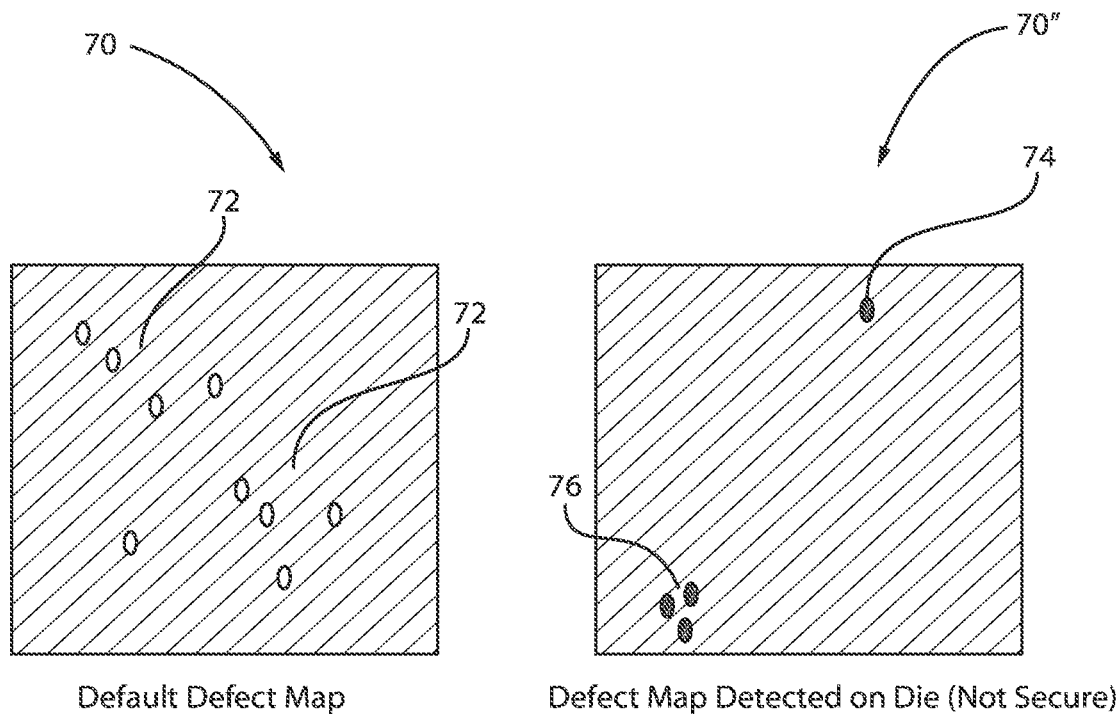
FIG. 6 is a block/flow diagram of a comparison between a default defect map and a defect map detected on a die, where the die is deemed to not be secure, in accordance with an embodiment of the present invention.

FIG. 6 is a block/flow diagram of a comparison between a default defect map and a defect map detected on a die, where the die is deemed to not be secure, in accordance with an embodiment of the present invention.

The default defect map 70 includes a plurality of intentional defects 72 inserted or imprinted into a memory array 30 of a chip 12 on a wafer 10. The defect map 70" detected on the die by the electrical test tool 1080 (FIG. 9) at the end of processing includes defect 74, 76. Defect 74 is an actual defect inadvertently created during the manufacturing of the chip. Defect 74 is not out of the ordinary. Defect 74 is an acceptable defect that does not affect the performance of the chip. However, defect 76 is not a normal or actual defect nor an intentional defect. In fact, defect 76 appears to be an attempt to create a fake id for the chips.

Thus, in the instant case, the electrical test tool 1080 (FIG. 9) at the end of processing determines that the defect map is not acceptable and that the wafer is not secure or has been compromised. In other words, when a comparison is made between the defect map 70" and the initial or original or default map 70, it is determined that the defects 74 are acceptable, but the defects 76 seem to be suspicious. As a result, it is determined that chip 12 has potentially been compromised. Thus, such wafer 10 needs to be removed from the wafer pool.

Figure 7:
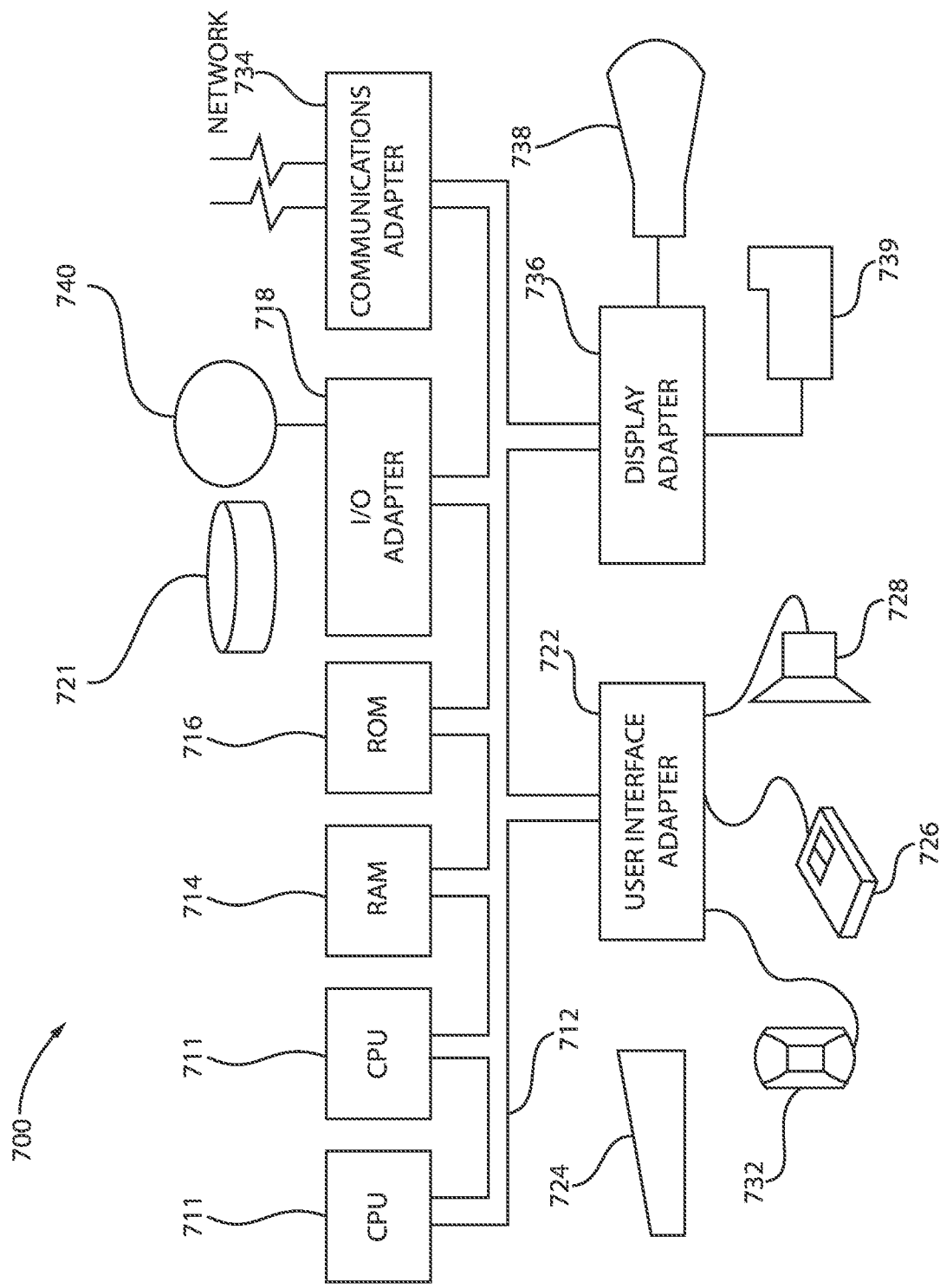
FIG. 7 is an exemplary processing system employed in a semiconductor manufacturing environment, in accordance with embodiments of the present invention.

FIG. 7 is an exemplary processing system employed in a semiconductor manufacturing environment, in accordance with embodiments of the present invention.

Referring now to FIG. 7, this figure shows a hardware configuration of computing system 700 according to an embodiment of the present invention. As seen, this hardware configuration has at least one processor or central processing unit (CPU) 711. The CPUs 711 are interconnected via a system bus 712 to a random access memory (RAM) 714, read-only memory (ROM) 716, input/output (I/O) adapter 718 (for connecting peripheral devices such as disk units 721 and tape drives 740 to the bus 712), user interface adapter 722 (for connecting a keyboard 724, mouse 726, speaker 728, microphone 732, and/or other user interface device to the bus 712), a communications adapter 734 for connecting the system 700 to a data processing network, the Internet, an Intranet, a local area network (LAN), etc., and a display adapter 736 for connecting the bus 712 to a display device 738 and/or printer 739 (e.g., a digital printer or the like).

Figure 8:
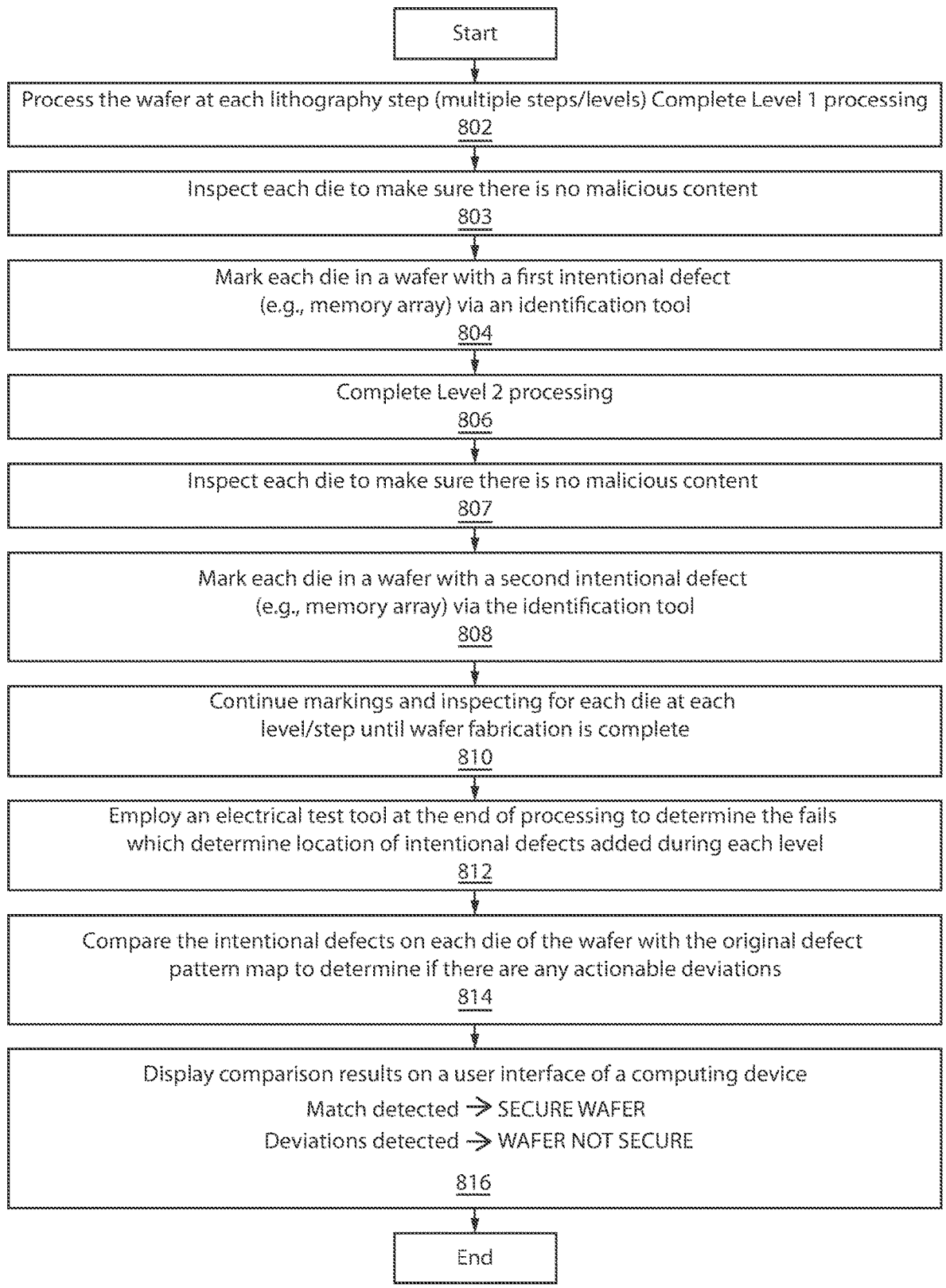
FIG. 8 is a block/flow diagram of a method for enabling chip processing security in a fabrication lab, in accordance with an embodiment of the present invention.

FIG. 8 is a block/flow diagram of a method for enabling chip processing security in a fabrication lab, in accordance with an embodiment of the present invention.

At block 802, process the wafer at each lithography step (multiple steps/levels). Complete level 1 processing.

At block 803, inspect each die to make sure there is no malicious content.

At block 804, mark each die in a wafer with a first intentional defect (e.g., memory array) via an identification tool.

At block 806, complete level 2 processing.

At block 807, inspect each die to make sure there is no malicious content.

At block 808, mark each die in a wafer with a second intentional defect (e.g., memory array) via the identification tool.

At block 810, continue markings and inspecting for each die at each level/step until wafer fabrication is complete.

At block 812, employ an electrical test tool to test the intentional defects of each die of the wafer at the end of processing.

At block 814, compare the intentional defects on each die of the wafer with the original defect pattern map to determine if there are any actionable deviations.

At block 816, display comparison results on a user interface of a computing device. If a match is detected, then the wafer is secure. If deviations are detected, then the wafer is not secure.

Figure 9:
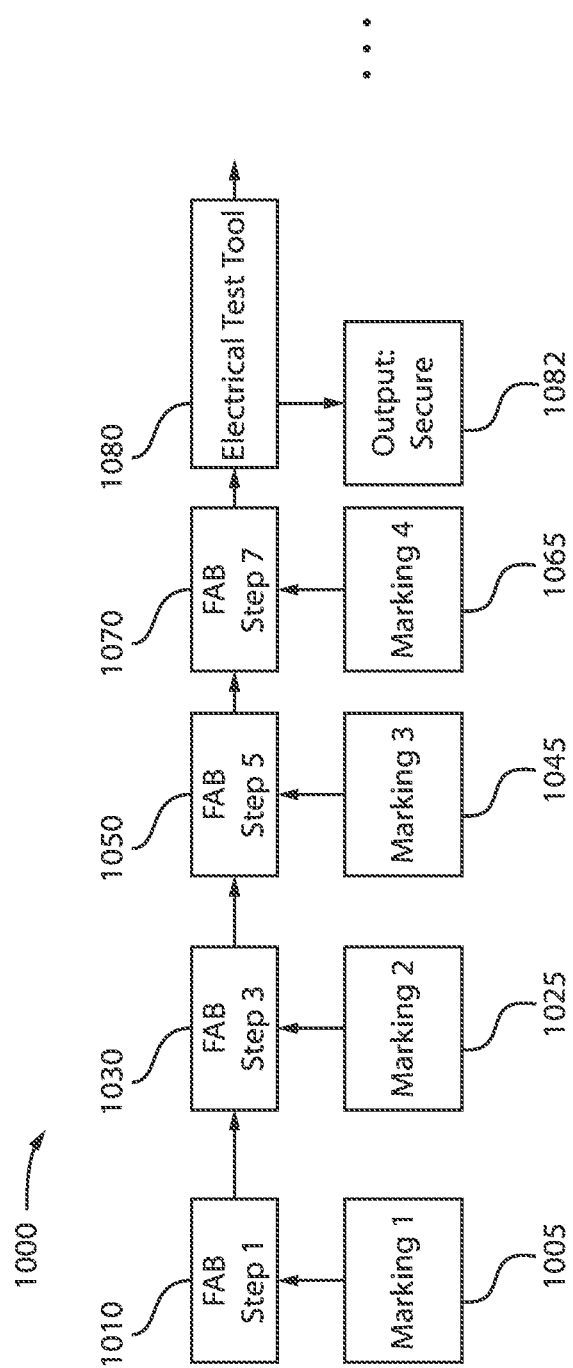
FIG. 9 is a block/flow diagram of a method for enabling chip processing security at alternate steps or levels of a semiconductor manufacturing process, in accordance with an embodiment of the present invention.

FIG. 9 is a block/flow diagram of a method for enabling chip processing security at alternate steps or levels of a semiconductor manufacturing process, in accordance with an embodiment of the present invention.

The security process 1000 involves a first fabrication phase where level 1 processing 1010 is completed. During level 1 processing 1010 a first intentional defect 1005 is inserted. The intentional defect can be, e.g., the insertion of a memory array including one or more damaged bits. A second fabrication phase can then take place where level 3 processing 1030 is completed. During level 3 processing 1030 a second intentional defect 1025 is inserted. The intentional defect can be, e.g., the insertion of a memory array including one or more damaged bits. A third fabrication phase can then take place where level 5 processing 1050 is completed. During level 5 processing 1050 a third intentional defect 1045 is inserted. The intentional defect can be, e.g., the insertion of a memory array including one or more damaged bits. A fourth fabrication phase can then take place where level 7 processing 1070 is completed. During level 7 processing 1070 a fourth intentional defect 1065 is inserted. The intentional defect can be, e.g., the insertion of a memory array including one or more damaged bits. After the fourth intentional defect 1065 has been inserted, and wafer fabrication is complete, the electrical test tool 1080 can be employed to inspect the intentional defects 1005, 1025, 1045, 1065. The electrical test tool 1080 can provide an output 1082 to the operator of the electrical test tool 1080. The output 1082 can be that the wafer is secure after wafer fabrication has been completed.

Therefore, this process can continue until all processing levels have been completed. In the process of FIG. 9, an intentional defect is inserted in alternate processing levels or steps. In other words, a $1^{st}$ intentional defect 1005 is inserted at level 1 processing 1010, a $2^{nd}$ intentional defect 1025 is inserted at level 3 processing 1030, a $3^{rd}$ intentional defect 1045 is inserted at level 5 processing 1050, etc. Thus, no intentional defects are inserted at the even processing levels (e.g., levels 2, 4, 6, etc.). Therefore, the marking steps can occur in an alternating matter, repeatedly, until either a malicious circuit is detected or until the fabrication process (i.e., all processing levels) have been completed.

Of course, one skilled in the art can contemplate inserting intentional defects at any desired levels. For example, intentional defects can be inserted only in important steps of the manufacturing process. One skilled in the art can contemplate inserting intentional defects at any combination of levels.

As used herein, the term "determining" encompasses a wide variety of actions. For example, "determining" can include calculating, computing, processing, deriving, investigating, looking up (e.g., looking up in a table, a database or another data structure), ascertaining and the like. Additionally, "determining" can include receiving (e.g., receiving information), accessing (e.g., accessing data in a memory) and the like. Furthermore, "determining" can include resolving, selecting, choosing, establishing and the like.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device.

It is to be understood that the present invention will be described in terms of a given illustrative architecture; however, other architectures, structures, substrate materials and process features and steps can be varied within the scope of the present invention.

It will also be understood that when an element such as a layer, region or substrate is referred to as being "on" or "over" another element, it can be directly on the other element or intervening elements can also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements can be present. In contrast, when an element is referred to as being "directly connected" or "directly coupled" to another element, there are no intervening elements present.

The present embodiments can include a design for an integrated circuit chip, which can be created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer can transmit the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which usually include multiple copies of the chip design in question that are to be formed on a wafer. The photolithographic masks are utilized to define areas of the wafer (and/or the layers thereon) to be etched or otherwise processed.

Methods as described herein can be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This can be extended, as readily apparent by one of ordinary skill in this and related arts, for as many items listed.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Spatially relative terms, such as "beneath," "below," "lower," "above," "upper," and the like, can be used herein for ease of description to describe one element's or feature's relationship to another element(s) or feature(s) as illustrated in the FIGS. It will be understood that the spatially relative terms are intended to encompass different orientations of the device in use or operation in addition to the orientation depicted in the FIGS. For example, if the device in the FIGS. is turned over, elements described as "below" or "beneath" other elements or features would then be oriented "above" the other elements or features. Thus, the term "below" can encompass both an orientation of above and below. The device can be otherwise oriented (rotated 90 degrees or at other orientations), and the spatially relative descriptors used herein may be interpreted accordingly. In addition, it will also be understood that when a layer is referred to as being "between" two layers, it can be the only layer between the two layers, or one or more intervening layers can also be present.

It will be understood that, although the terms first, second, etc. can be used herein to describe various elements, these elements should not be limited by these terms. These terms are only used to distinguish one element from another element. Thus, a first element discussed below could be termed a second element without departing from the scope of the present concept.

Having described preferred embodiments of methods and devices for semiconductor device security (which are intended to be illustrative and not limiting), it is noted that modifications and variations can be made by persons skilled in the art in light of the above teachings. It is therefore to be understood that changes may be made in the particular embodiments described which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method executed on a processor for detecting whether a wafer has been tampered during a semiconductor fabrication process, the method comprising:

at a plurality of patterning steps where lithographic patterns are defined and etched:
marking, via an identification tool, each die with an intentional defect in a memory array;

inspecting, via an inspection tool, each of the dies to detect the intentional defect as well as semiconductor processing defects;

distinguishing the intentional defect from the semiconductor processing defects within the dies; and removing compromised wafers from a wafer pool during the semiconductor fabrication process.

2. The method of claim 1, wherein the intentional defect is defined by damaged bits in the memory array.

3. The method of claim 1, wherein the intentional defect is not discernable during the semiconductor fabrication process, and wherein the intentional defect is only discernable during electrical test at the end of wafer processing.

4. The method of claim 1, wherein each of the die of the wafer are scanned by a scanning electron microscope (SEM).

5. The method of claim 4, wherein a scanned pattern of each of the die of the wafer are compared to an original design pattern to determine tampering.

6. The method of claim 1, wherein the inspection tool is controlled by a third party.

7. The method of claim 1, wherein the distinguishing step is implemented by artificial intelligence techniques.

8. A non-transitory computer-readable storage medium comprising a computer-readable program executed on a processor in a data processing system for detecting whether a wafer has been tampered during a semiconductor fabrication process, wherein the computer-readable program when executed on the processor causes a computer to perform:

at a plurality of patterning steps where lithographic patterns are defined and etched:

marking, via an identification tool, each die with an intentional defect in a memory array;

inspecting, via an inspection tool, each of the dies to detect the intentional defect as well as semiconductor processing defects;

distinguishing the intentional defect from the semiconductor processing defects within the dies; and removing compromised wafers from a wafer pool during the semiconductor fabrication process.

9. The non-transitory computer-readable storage medium of claim 8, wherein the intentional defect is defined by damaged bits in the memory array.

10. The non-transitory computer-readable storage medium of claim 8, wherein the intentional defect is not discernable during the semiconductor fabrication process, and wherein the intentional defect is only discernable during electrical test at the end of wafer processing.

11. The non-transitory computer-readable storage medium of claim 8, wherein each of the die of the wafer are scanned by a scanning electron microscope (SEM).

12. The non-transitory computer-readable storage medium of claim 11, wherein a scanned pattern of each of the die of the wafer are compared to an original design pattern to determine tampering.

13. The non-transitory computer-readable storage medium of claim 8, wherein the inspection tool is controlled by a third party.

14. The non-transitory computer-readable storage medium of claim 8, wherein the distinguishing step is implemented by artificial intelligence techniques.

15. A system for detecting whether a wafer has been tampered during a semiconductor fabrication process, the system comprising:

an identification tool for marking each die with an intentional defect in a memory array; and an inspection tool for inspecting each of the dies to detect the intentional defect as well as semiconductor processing defects, the marking and inspecting performed at a plurality of patterning steps where lithographic patterns are defined and etched, to remove compromised wafers from a wafer pool during the semiconductor fabrication process, wherein the intentional defect is distinguished from the semiconductor processing defects within the dies.

16. The system of claim 15, wherein the intentional defect is defined by damaged bits in the memory array.

17. The system of claim 15, wherein the intentional defect is not discernable during the semiconductor fabrication process, and wherein the intentional defect is only discernable during electrical test at the end of wafer processing.

18. The system of claim 15, wherein each of the die of the wafer are scanned by a scanning electron microscope (SEM).

19. The system of claim 18, wherein a scanned pattern of each of the die of the wafer are compared to an original design pattern to determine tampering.

20. The system of claim 15, wherein the inspection tool is controlled by a third party.

* * * * *